G. REHFUSS,

Assignor to AMERICAN BUTTONHOLE OVERSEAMING AND SEWING MACHINE CO.

SHUTTLE FOR SEWING MACHINES.

No. 10,103. Reissued May 2, 1882.

Witnesses:
James F. Tobin
Harry Smith

Inventor:
George Rehfuss
by his Attorneys
Howson and Sons

N. PETERS, Photo-Lithographer, Washington, D. C.

UNITED STATES PATENT OFFICE.

GEORGE REHFUSS, OF PHILADELPHIA, PENNSYLVANIA, ASSIGNOR TO AMERICAN BUTTONHOLE, OVERSEAMING AND SEWING MACHINE COMPANY, OF SAME PLACE.

SHUTTLE FOR SEWING-MACHINES.

SPECIFICATION forming part of Reissued Letters Patent No. 10,103, dated May 2, 1882.

Original No. 139,421, dated May 27, 1873. Application for reissue filed March 12, 1881.

*To all whom it may concern:*

Be it known that I, GEORGE REHFUSS, of Philadelphia, Pennsylvania, have invented an Improved Shuttle, of which the following is a specification.

Figure 1:
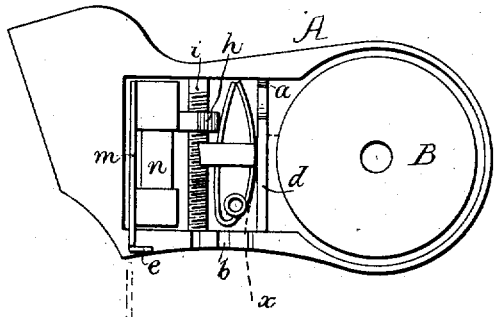
Figure 2:
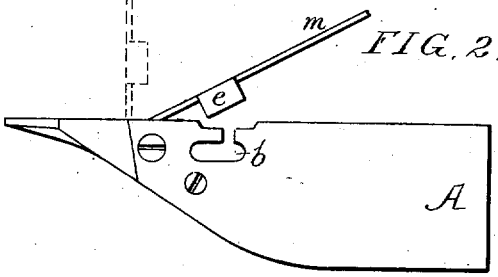
Figure 3:
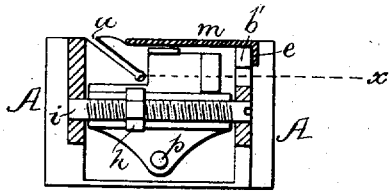

The objects of my invention are to enable a sewing-machine shuttle to be threaded and unthreaded with greater facility than usual, to obtain a tension upon the thread, and to regulate such tension. I accomplish these objects by passing the bobbin-thread *x* through slits *a* and *b*, formed in a transverse partition, *d*, of the shuttle-case, and in the side of the latter, as shown in the face view Figure 1, edge view Fig. 2, and transverse section Fig. 3, of the accompanying drawings, instead of passing it through holes, as usual, the disengagement of the thread being prevented by the inclination of the slit *a* and by a tongue, *e*, of the bobbin-retaining plate, which closes the mouth of the slit *b*, and I obtain the required tension by the use of an elliptic spring, D, the pressure of which against the thread passing between the same and the partition *d* is regulated by the adjustment of a nut, *h*, on a screw-spindle, *i*, as best observed in the enlarged section, Fig. 4, and perspective view, Fig. 5.

The shuttle is of the same general shape as those in common use, it being recessed for the reception of the tension devices, and having an enlargement of its rear end for the reception of the bobbin *k*, which is retained in place, as usual, by a spring-plate, *m*, hinged to the shuttle-case at *n*. A partition, *d*, extends transversely across the shuttle-case adjacent to the bobbin, and in the upper edge of the same, close to one side, is cut an inclined slit, *a*, for the passage of the thread *x*, which is drawn between the said partition and an elliptic tension-spring, D, toward and through a slit, *b*, in the side of the shuttle-case, the inclination of the slit *a* preventing the disengagement of the thread from the partition, and the retention of the said thread within the slit *b* being insured by a tongue or lug, *e*, of the plate *m*, which covers the entrance to the said slit, as plainly shown in Figs. 2 and 3.

Figure 4:
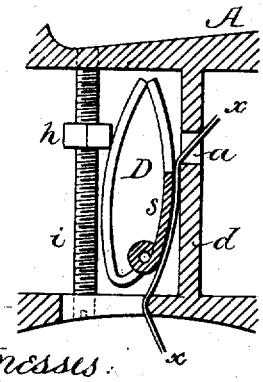
Figure 5:
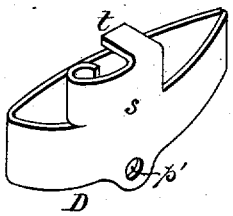

The tension-spring D is of the peculiar shape best observed in the enlarged section, Fig. 4, and perspective view, Fig. 5. It is adapted to the space within the shuttle-case between the partition *d* and a screw-spindle, *i*, and is retained in position by a pin, *p*, of the partition, which extends into a hole, *p'*, in the said spring; or the latter may be provided with a pin adapted to a hole in the partition.

The portion *s* of the spring which bears against the thread is rounded, as shown, to prevent undue friction and abrasion of the thread, and a tongue, *t*, on this portion of the spring serves as a guide to direct the thread to its proper position in threading the shuttle. The tension of the thread can be regulated to a nicety by simply turning the screw-spindle *i*, which will cause a nut, *h*, on the same to be moved in one direction or the other, and to thus compress or relieve the spring, according as it is required to increase or lessen the tension.

In threading the shuttle the operator simply holds the same with the bobbin between the thumb and finger of one hand, and with the other draws the thread into the inclined slit *a*, between the spring and partition, and through the slit *b*, the retaining-plate *m* being then closed to prevent disengagement of the thread and bobbin, and in unthreading the shuttle the operation is simply reversed after lifting the retaining-plate, the tedious manipulation required in passing the thread through holes, as in ordinary shuttles, being entirely avoided.

Owing to the peculiar elliptical or rounded form of the tension-spring and to the method of securing the same in place, it is capable of rocking or yielding sufficiently to permit the passage past the same of knots when they occur in the thread.

I claim as my invention—

1. The combination, with a shuttle-case provided with a slit, *b*, for the reception and removal of the thread, of the hinged plate *m*, adapted to cover the side opening of the shuttle and retain the bobbin, and having a lip, *e*, extending over the outside of the case, and overlapping and partly closing the said slit *b* in the shuttle-case, as specified.

2. The combination of the shuttle-case A, a partition, *d*, extending across the interior of the case, and having an inclined slit, *a*, with a spring, D, and a screw having a nut, *h*, by adjusting which the spring can be made to force the thread with more or less pressure against the partition, substantially as described.

In testimony whereof I have signed my name to this specification in the presence of two subscribing witnesses.

GEO. REHFUSS.

Witnesses:
MARTIN O. REHFUSS,
HARRY SMITH.